Jan. 3, 1950 J. E. HAWKINS 2,493,534
TESTING DEVICE FOR SEISMIC SIGNAL APPARATUS
Filed June 13, 1947 2 Sheets-Sheet 1

INVENTOR.
James E. Hawkins
BY
Attorney

Jan. 3, 1950 J. E. HAWKINS 2,493,534
TESTING DEVICE FOR SEISMIC SIGNAL APPARATUS
Filed June 13, 1947 2 Sheets-Sheet 2
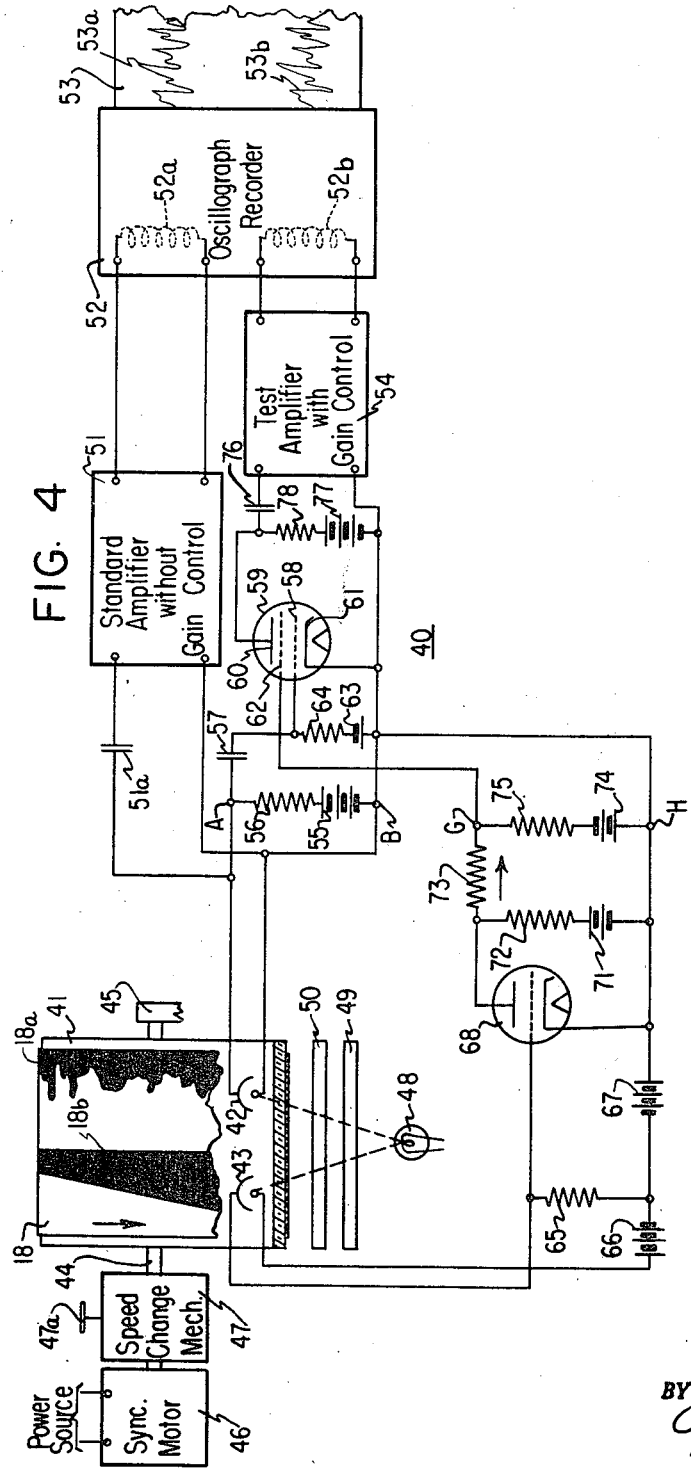
INVENTOR.
James E. Hawkins
BY
Richard D Mason
Attorney Patented Jan. 3, 1950

2,493,534

UNITED STATES PATENT OFFICE 2,493,534

TESTING DEVICE FOR SEISMIC SIGNAL APPARATUS

James E. Hawkins, Tulsa, Okla., assignor to Seismograph Service Corporation, Tulsa, Okla., a corporation of Delaware Application June 13, 1947, Serial No. 754,379

12 Claims. (Cl. 177—352.7)

The present invention relates to methods and apparatus for determining the characteristics of seismic wave translating apparatus and more particularly to methods and apparatus for testing seismic wave amplifiers equipped with gain control facilities.

Determination of the operating characteristics of seismic wave translating apparatus with any degree of reliability has in the past been exceedingly difficult due to the difficulties involved in generating a signal typically representative of a seismic wave train. Thus field testing is difficult and expensive since in such testing, detonation of an explosive charge in the earth is required. to produce each wave train and duplication of a particular wave train pattern during successive shots is impossible. Further, no practical method has heretofore been evolved for recording a seismic wave train without distortion in a form suitable for accurate reproduction as an electrical signal, for the reason that conventional recording means are not capable of handling the wide relative amplitude range (of the order of 1000 to 1) of the components of a seismic wave train. As used herein, the term "distortion" means artificially changing the relative amplitudes of the components of a seismic wave train for at least a portion of the wave train. Faithful preservation of the relative amplitude pattern of a signal representative of a typical seismic wave train is of particular importance in the testing of seismic wave amplifiers equipped with gain control facilities where it is desired to determine the specific operating characteristics of the gain control facilities. Moreover, artificial generation of a typical seismic wave train by means of conventional signal generators has been practically impossible because of the irregularity (non-periodicity) of the wave train components. Due to the abovementioned difficulties, it has in the past been impossible to obtain more than rough qualitative data regarding the operating characteristics of seismic wave translating apparatus and particularly seismic wave amplifiers equipped with gain control facilities.

It is an object of the present invention, therefore, to provide improved methods and apparatus for determining one or more of the operating characteristics of seismic wave train translating apparatus, which satisfactorily obviate the abovementioned difficulties.

It is another object of the invention to provide improved methods and apparatus of the character described in which the problem of recording and then reproducing a seismic wave train without substantial amplitude distortion of the original signal components is fully obviated.

According to still another object of the invention, reproduction of the recorded wave train may be accomplished on a repetitive basis, thereby to provide for repeated testing of a unit of seismic translating apparatus with identical signal input conditions.

In accordance with a still further object of the invention, reproduction of the recorded wave train may be effected at different speeds, thereby to provide for testing of a unit of seismic translating apparatus over different input frequency ranges.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

Fig. 3 is a record obtained by employing the testing apparatus shown in Fig. 1 of the drawings, and Fig. 4 illustrates a test circuit embodying certain features of the present invention, which is arranged to employ the record of Fig. 3 in the production of signals comparable to seismic signals for testing purposes.

Although it has been the general practice in seismic prospecting to produce seismic records which are in the form of visual inspection traces, seismic records of the so-called variable area or variable density type have also been employed. The present invention is specifically described hereinafter in connection with the production and reproduction of variable area traces or tracks for signal generating purposes, but it should be understood that these tracks might equally well comprise variable density traces. The advantages of seismic records of the variable density or variable area trace is that they are phonographically reproducible and an analysis thereof can be accomplished by repetitive reproduction, whereby undesirable wave components can be eliminated therefrom. Such an arrangement is disclosed in prior copending Hawkins application, Serial No. 663,205 filed April 18, 1946, and assigned to the same assignee as the present application.

Figure 2:
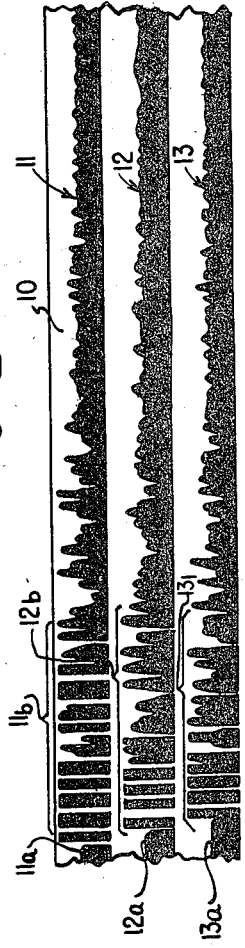
Fig. 2 is a typical seismic record of the variable area type, three traces being shown, in which the seismic amplifier employed has no automatic gain control.

As pointed out above, due to the fact that a typical seismic signal wave train includes wave components of very high amplitude and wave components of very small amplitude, it is impossible, when recording with conventional recording equipment, to preserve the real relative amplitude relationship between the wave components in producing a variable area or variable density trace of a typical seismic wave train. Thus in Fig. 2 of the drawings there is shown a typical seismic record 10 having traces 11, 12 and 13 of the variable area type thereon. These traces were obtained by employing amplifiers of the type not equipped with gain control and consequently the high amplitude signals are cut off so that the record is not complete. It will be understood that in so-called reflection shooting the waves as received at the signal detectors include an initial tremor, the first break of which is often very weak. This weak energy is represented by the portions 11a, 12a, and 13a of the three traces 11, 12 and 13 respectively of the seismic record 10. Following the first break, a very strong series of refraction waves appear which are represented by the portions 11b, 12b and 13b of the traces 11, 12 and 13 respectively. Following this energy, a series of wave trains are received of progressively lower average amplitude as illustrated by the remaining portions of the variable area traces 11, 12 and 13. Since the traces of Fig. 2 are obtained with amplifiers not equipped with gain control, the portions of the traces 11b, 12b and 13b are of little use since the tops and bottoms thereof are cut off as is clearly indicated. To prevent a portion of the record from extending beyond the range of the recording area for the trace, it is common practice to employ an amplifier in the recording apparatus between the geophones and the recorder which is provided with some means of gain control or automatic volume control as it is often referred to. Improvements in an amplifier of this character are disclosed and claimed in prior copending joint application, Serial No. 673,744, Hawkins and Cornett, filed June 1, 1946, and assigned to the same assignee as the present application. However, use of automatic gain control means in the amplifying channel to compress the amplitude of the high energy components of the wave train gives rise to distortion of the train in the sense explained above.

Figure 1:
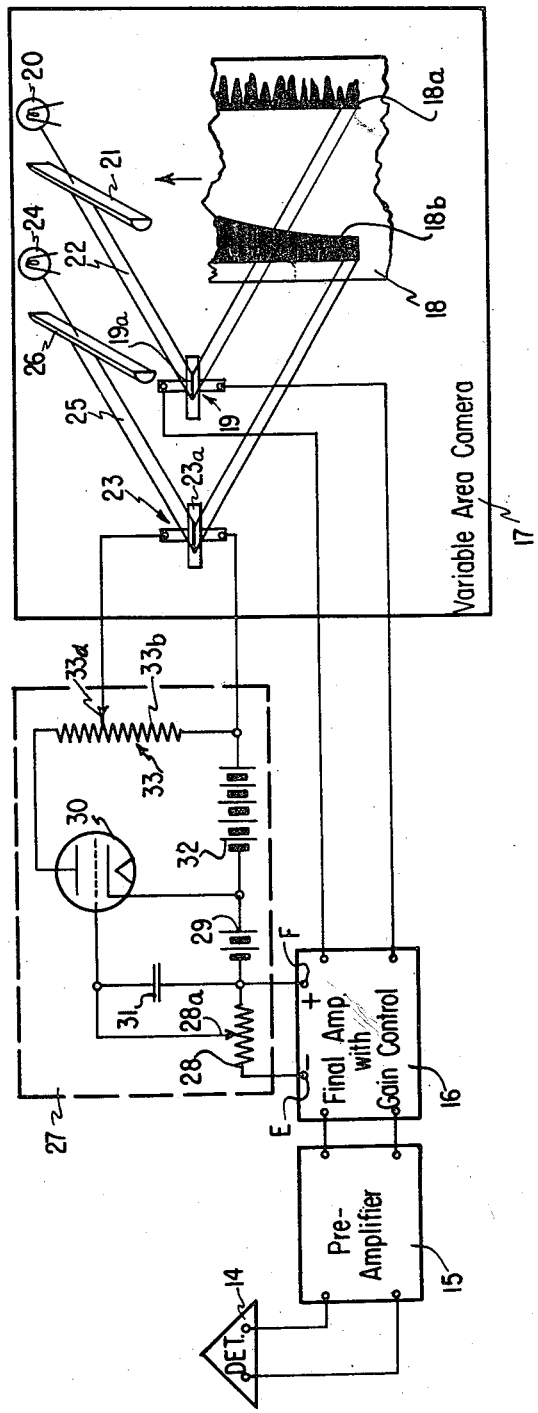
Fig. 1 is a schematic diagram of apparatus for obtaining a record which may be used repeatedly to reproduce seismic waves for testing purposes.

In accordance with the present invention there is illustrated in Fig. 1 of the drawings apparatus for producing a variable area trace of a seismic wave train including an amplifier with automatic gain control, together with means for simultaneously producing a trace which is representative of the gain, either directly or inversely of the amplifier through which the seismic wave train is transmitted to the recorder. In brief, this apparatus comprises a suitable signal responsive device or detector 14, generally referred to as a geophone, which is connected through a suitable pre-amplifier 15, and a final amplifier 16 equipped with gain control to one oscillographic element 19 of a camera 17 of the variable area type. The pre-amplifier 15 may be of any conventional type commonly used in the art, and the amplifier 16, which is provided with gain control means, is preferably of the type disclosed and claimed in the above-mentioned co-pending joint application. As illustrated, the variable area camera 17 is provided with suitable means for supporting and moving a movable record strip such as 18. Since the means for accomplishing the movement of the record strip 18 forms no part of the present invention, a disclosure thereof has been omitted in the interests of simplifying the disclosure. The record strip 18 is preferably a film of any suitable type, and is adapted to be moved in the direction of the arrow indicated in Fig. 1 of the drawings.

In order to produce a variable area type record trace 18a on the record 18 which is representative of a seismic wave train received by the detector 14, the output terminals of the amplifier 16 are connected to the oscillographic element 19 of the recorder 17. This element may be of any suitable type, such as, for example, as a coil rotating in a magnetic field and bearing a mirror 19a. Light from a suitable source 20 is adapted to be converted into a narrow beam 22 having a substantial width in one direction only by means of a lens 21 interposed between the source 20 and the mirror 19a. This beam is reflected from the mirror onto the light sensitive strip 18 so as to produce the variable area trace 18a in response to movement of the mirror 19a.

By virtue of the action of the gain control means embodied in the amplifier 16, a variable area trace 18a is produced which, as best shown in Fig. 3 of the drawings, contains all of the seismic information received at the detector 14, although throughout the portion 18a' of the trace the amplitudes of the high amplitude components of the wave are compressed. Throughout this portion of the record, however, the peaks of the wave components are not cut off as was the case in the variable area traces illustrated in Fig. 2 of the drawings. The described gain control action is obtained through the action of the gain control means in varying the gain of the amplifier 16 inversely in accordance with the average amplitude of the signal voltage developed at the output terminals of the amplifier.

In order to provide a record trace on the record 18 representative of the gain of the seismic amplifier 16, the variable area camera is provided with a second oscillographic element 23 identical with the oscillagrophic element 19 and including a movable mirror 23a. Light from a suitable source 24 is converted into a narrow beam 25 by means of a lens 26 disposed between the light source 24 and the mirror 23a. Thus the oscillographic element 23 is capable of producing a second variable area trace 18b on the movable record strip 18. In accordance with the present invention, a variable voltage representative of the variations in gain of the amplifier 16 is applied to the driving coil of the oscillographic element 23 through a suitable amplifier 27. Preferably, the arrangement is such that the width of the variable area trace 18b is varied inversely with the gain of the amplifier 16, although it will be understood that the converse type of record may be obtained if suitable modifications are made in the circuit. In the illustrated system, a voltage is derived from the amplifier 16 which varies directly in accordance with the average amplitude of the signal applied to the amplifier 16. This voltage is that appearing across the terminals E and F of the network shown in the above-mentioned co-pending application Serial No. 673,744. It is supplied to the terminals E and F of a resistor 28 from which a variable portion thereof may be obtained by means of an adjustable tap 28a. The voltage obtained from the resistor 28 is impressed between the grid and cathode of an amplifier tube 30 in series with a negative bias voltage supplied by a suitable C battery 29. Preferably, the encircuited portion of the resistor 28 is shunted by a suitable by-pass capacitor 31. The output circuit of the triode 30 serially includes a suitable source of anode voltage, illustrated as a battery 32, and a load resistor 33. A tap 33a adjustable along the load resistor 33 is provided to permit any desired portion of the voltage developed across the resistor 33 to be impressed upon the oscillographic element 23.

With the above-described arrangement, a variable area trace 18b is produced on the record strip 18 simultaneously with the production of the seismic trace 18a during operation of the described apparatus to record a seismic wave train detected by the detector 14. Any suitable process may be employed to develop the record strip after it is exposed during a recording operation. As best shown in Fig. 3 of the drawings, the trace 18b comprises a portion 18b' of maximum width which is produced during the time interval when the gain control means in the amplifier 16 causes this amplifier to operate with minimum gain. In other words the width of the variable area trace 18b is inversely proportional to the gain of the amplifier 16 or directly proportional to the degree of amplitude compression of the seismic wave train as recorded by the trace 18a. It will thus be apparent that the record 18 having the variable area traces 18a and 18b thereon is capable of being phonographically reproduced to generate a signal truly representative of a seismic wave train which can be applied to a unit of seismic wave translating apparatus for test purposes. It will also be understood that the record 18 can be made by firing a single explosive charge in the earth's crust.

Referring now more particularly to Fig. 4 of the drawings, there is illustrated test apparatus generally designated at 40 which is used to determine the operating characteristics of a unit of seismic translating apparatus in the form of a seismic wave amplifier 54. In general, this apparatus comprises a device 41 for phonographically reproducing the seismic wave and gain control traces 18a and 18b of the record strip 18 as corresponding electrical signals, an oscillographic recorder 52, an amplifier 51 for impressing the reproduced seismic wave signal directly upon one of the galvanometer elements of the recorder 52, and an electrical translating network comprising the tubes 59 and 68 for converting the reproduced seismic wave signal to the same form (as regards the relative amplitudes of the components thereof) as the seismic wave train detected by the detector 14 and then impressing the seismic wave signal upon the input terminals of the test amplifier 54. The reproducing device 41 is in many respects similar to that disclosed in prior Hawkins co-pending application Serial No. 663,205 referred to above. Briefly, this device, as illustrated schematically in the drawings, comprises a rotatable drum 41 which is provided with suitable means for supporting for rotation therewith on the outer periphery thereof the record 18 having the variable area traces 18a and 18b developed thereon. It will be understood that the record 18, for example, may have its ends spliced together to provide an endless belt which may be mounted on the outer periphery of the drum 41 in any suitable manner.

To permit translation of the recorded variable area seismic wave trace 18a into a corresponding electrical signal, the rotatable drum 41 is preferably constructed as a hollow transparent drum within which is disposed a photoelectric cell assembly comprising the photoelectric cells 42 and 43. Specifically, the drum 41 may be formed of any suitable transparent material such as glass, methyl methacrylate, or the like and preferably is supported for rotation on a shaft 44 mounted on appropriate bearings one of which is indicated at 45. This shaft is connected to a synchronous driving motor 46 through a change speed mechanism schematically indicated at 47. With this arrangement, the transparent drum 41 may be rotated around the photoelectric cell assembly comprising the photoelectric cells 42 and 43 at any desired synchronous speed merely by manipulating the speed control knob 47a associated with the change speed gear mechanism 47.

It will be understood that the reason for employing the transparent drum 41 is to enable light rays from a suitable source to be fed through the film record 18 and the drum 41 to the photoelectric cells 42 and 43. Accordingly, there is provided a source of light 48 spaced a short distance away from the drum 41 preferably on a line perpendicular with the axis of the drum and intersecting a point substantially midway between the ends thereof. Interposed between the drum 41 and the light source 48, is a mask 49 having a longitudinally extending slit, not shown. Interposed between the mask 49 and the drum 41 is a suitable lens 50 having its long axis disposed at right angles to the direction of motion of the record strip 18 as indicated by the arrow in Fig. 4 of the drawings. Light from the source 48 in passing through the slit in the mask 49 and the lens 50 is directed as a narrow horizontal beam through the film or record 18 and the transparent drum 41 onto the photoelectric cells 42 and 43. It will be apparent that part of this beam of light will be intercepted by each of the variable area traces 18a and 18b on the film or record strip 18. The amount of light falling on a particular one of the photoelectric cells 42 and 43 at any given instant depends upon the amount of light passed through the clear portion of the film upon which the light beam from the source 48 is focused. Consequently the light falling on each of the photoelectric cells depends upon the width of the associated variable area trace on the record strip 18 which of course varies from instant to instant during rotation of the drum 41. Since the electrical impedance and in particular the resistance of each photoelectric cell varies with the amount of light intercepted by the cell, electrical signals are produced by the cells 42 and 43 during rotation of the drum 41 which vary in amplitudes in accordance with variations in the widths of the traces 18a and 18b.

As pointed out above, the photoelectric cell 42 is coupled to the input terminals of a suitable amplifier 51, the output terminals of which are connected to the galvanometer coil 52a of one of the recording elements provided in the oscillographic recorder 52. The oscillographic recorder 52 may be of any desired commercial type and is provided with a plurality of galvanometer elements for producing a plurality of traces on a movable record strip 53. Energization of the galvanometer coil 52a controls the shape of the curve 53a produced on the record strip 53. In using the described apparatus to test a seismic signal amplifier 54, for example, the coil 52b of a second galvanometer element is connected to the output terminals of the test amplifier and responds to the signal output voltage of the test amplifier to produce a trace 53b on the record strip 53. The amplifier 51 is a standard seismic signal amplifier having no gain control means and having a substantially flat response characteristic over the entire frequency range embracing all frequency components of a seismic wave train.

In order to supply the test amplifier 54 with a seismic signal representative of the seismic wave train initially received by the detector 14 without the amplitude distortion produced by the automatic gain control means of the amplifier 16 employed in initially recording this signal, the translating network comprising the tubes 59 and 68 is provided. Specifically, the photoelectric cell 42 has its electrodes connected across a suitable source of potential 55 in series with a resistor 56, such that the voltage across the terminals A and B is varied in accordance with the envelope of the trace 18a in response to the changing conductivity of the cell 42 which occurs during reproduction of this trace. The voltage variations appearing across the terminals A and B are impressed between the cathode 61 and control grid 58 of the amplifier tube 59 through a suitable coupling condenser 57. These voltage variations are also impressed upon the input terminals of the amplifier 51 through a coupling condenser 51a. A suitable negative bias from a source of potential indicated as a C battery 63 is also applied to the control grid 58 through a leak resistor 64. It will be apparent that without additional means the tetrode 59 will function as an amplifier with the anode circuit thereof serially including a source of anode potential 77 and a load resistor 78, and being coupled to the input side of the test amplifier 54 through the coupling condenser 76. However, with the arrangement as described thus far, the signal applied to the test amplifier 54 will not be the undistorted seismic wave train received by the detector 14 of Fig. 1 of the drawings, but rather will be a signal wave train having a degree of amplitude compression of certain components of the train determined by the action of the gain control means in the amplifier 16.

For the purpose of removing the amplitude distortion from the seismic signal train applied to the input terminals of the test amplifier 54, the positive potential applied to the screen grid 62 of the tetrode 59 is varied in accordance with an inverse gain control signal obtained by reproduction of the variable area trace 18b. To this end, the electrodes of the photoelectric cell 43 are connected across a series circuit comprising a grid resistor 65 and a direct current source 66, and the grid resistor 65 is connected between the input electrodes of the tube 68 in series with a source of bias potential 67. With this circuit arrangement variations in the conductivity of the cell 43 occasioned by reproduction of the record trace 18b produce corresponding variations in the voltage impressed between the grid and the cathode of the tube 68. The output circuit of the tube 68 is in the form of a voltage dividing network which serially includes a load resistor 73 and an anode current source 71 shunted by two resistors 73 and 75 and a second direct current source 74 also connected in series. The points G and H of this voltage dividing circuit are connected respectively to the screen electrode 62 and cathode 61 of the amplifier tube 56. Thus operating screen potential is applied to the screen electrode 62 of the tube 59 from the voltage dividing network forming the output circuit of the tube 68.

Referring now more particularly to the operation of the test apparatus illustrated in Fig. 4 of the drawings, it will be understood that with the reproducing device in operation, the wave train represented by the envelope of the trace 18a is translated by the photocell 42 into a corresponding electrical signal during each revolution of the drum 41. Specifically, the signal voltage is developed across the terminals A and B, and is impressed between the input terminals of the standard amplifier 51 through the coupling condenser 51a. Following amplification through the amplifier 51 the signal voltage is impressed upon the coil 52a of one of the galvanometer elements in the oscillographic recorder 52. With the latter recorder in operation, a visual trace 53a is produced on the record strip 53 through the response of the galvanometer element to the signal voltage impressed on the coil 52a thereof by the amplifier 51.

In a similar manner, the signal voltage developed across the terminals A and B is amplified through the amplifier tube 59 and impressed upon the input terminals of the test amplifier 54. Following amplification by the latter amplifier, this voltage is impressed upon the coil 52b of a second galvanometer element in the oscillographic recorder 52 to effect production of the visual trace 53b in synchronism with production of the trace 53a.

It will be recalled from the preceding explanation, particularly with reference to Fig. 3 of the drawings, that the portion 18a' of the trace 18a is representative of wave components having amplitudes which were materially compressed during recording through the action of the automatic gain control means provided in the amplifier 16. Further, since the standard amplifier 51 is not equipped with gain control facilities and is characterized by a substantially flat response characteristic over the frequency range embracing all frequencies of the wave components forming the trace 18a, the visual trace 53a produced on the record strip 53 is truly representative of the variable area trace 18a, including the amplitude distorted portion 18a' thereof. In other words, the distortion is intentionally retained in the visual trace 53a incident to the reproducing and rerecording operation. This means that if a signal truly representative of the seismic wave train as detected by the detector 14 is impressed upon the input terminals of the test amplifier 54 synchronously with application of the amplitude distorted signal voltage to the standard amplifier 51, and the gain control facilities of the test amplifier 54 operate to produce the requisite amount of amplitude compression during that portion of the signal train corresponding to the variable area trace segment 18a', then the two traces 53a and 53b should be of matching amplitude pattern. Any discrepancies in the patterns of the two visual traces may be analyzed for the purpose of determining the reasons for improper operation of the amplifier 54 and particularly the gain control means thereof, and of making the circuit changes or adjustments which may be required in order to impart the desired operating characteristics to this amplifier. It is for the above-stated reason that the variable area gain control trace 18b is produced on the record strip 18 synchronously with production of the trace 18a and that gain control facilities comprising the tube 68 are provided to control the gain of the amplifier tube 59 in accordance with the width of the trace 18b during reproduction of the trace 18a.

In considering the manner in which the gain of the amplifier tube 59 is controlled, it is first pointed out that the signal gain through this tube may be varied within relatively wide limits by changing the magnitude of the positive potential applied to its screen electrode 62. More specifically, as this potential is increased in a positive direction, a corresponding if not proportionate increase is realized in the signal gain through the tube. The converse action occurs when the positive potential on the screen electrode 62 is decreased. It will thus be understood that as the width of the gain control trace 18b increases, the positive potential applied to the screen electrode 62 should be increased to produce a corresponding increase in the gain through the tube 59 and vice versa.

Normally the gain through the tube 59 is that which obtains when light from the source 48 strikes the cathode of the photocell 43 without obstruction by the opaque trace 18b. When this condition prevails, maximum conductivity of the photocell 43 obtains, with the result that the voltage drop across the resistor 65 is a maximum. This voltage drop is opposed in polarity to the voltage of the source 67 and has the effect of decreasing the negative bias on the grid of the tube 68. Hence, space current flow through the tube 68 is at a maximum when the cathode of the photocell 43 is fully illuminated from the source 48. Space current flow through the tube 68 from the anode current source 71 has the effect of robbing the resistors 73 and 75 of current flow from the same source. Hence, the voltage drop across the resistor 75 is a minimum when space current flow through the tube 68 is a maximum. However, the voltage drop across the resistor 75 opposes and always exceeds the voltage of the current source 74 and is of the correct polarity to render the screen electrode 62 positive with respect to the cathode 61 of the tube 59. Preferably, the circuit constants of the components included in the input and output circuits of the tube 68 are so chosen that with the cathode of the photocell 43 fully illuminated from the light source 48, the screen potential of the tube 59 is maintained at a value which will hold the signal gain through this tube at a level slightly below normal.

During reproduction of the record 18 and more particularly the gain control trace 18b, a portion of the light falling on the cathode of the photocell 43 from the source 48 is intercepted by the trace 18b to decrease the current flow through the photocell. Obviously, the amount of light intercepted increases with the width of the trace to produce a corresponding decrease in the conductivity of the photocell. As current flow through this cell is thus decreased, the voltage drop across the resistor 65 is decreased to produce an increase in the negative bias on the control grid of the tube 68 and hence decrease space current flow through this tube. This action results in an increase in current flow through the resistors 73 and 75 to produce an increase in the positive potential applied to the screen electrode 62 of the tube 59. Thus, the signal gain through this tube is increased in response to increasing width of the gain control trace 18b. Moreover, by appropriate proportioning of the circuit constants of the circuit components forming the input and output circuits of the tube 68, the increase in gain realized through a given increase in the width of the trace 18b may be proportioned to produce an increase in signal gain through the tube 59 which precisely compensates for the amplitude compression of the seismic wave trace 18a produced through the action of the gain control facilities in the amplifier 16 during the initial recording operation. The converse action obviously occurs in response to a decrease in the width of the gain control trace 18b, namely, the positive potential applied to the electrode 62 is decreased to produce a corresponding decrease in signal gain through the tube 59.

As indicated above, the circuit components of the gain control facilities embodied in the test apparatus 40 are so chosen as to restore to the original pattern the relative amplitudes of the wave components making up the seismic wave train recorded as the variable area trace 18a. In other words, the signal voltage appearing at the output side of the tube 59 and impressed upon the input terminals of the test amplifier 54 is identical in amplitude pattern with the signal voltage detected by the seismic detector 14 and amplified through the preamplifier 15. Hence, a signal voltage is produced which is exactly right in all of its characteristics for the testing of the test amplifier 54 under conditions precisely simulating field operating conditions and which may be applied to the test amplifier 54 on a repetitive basis. Specifically, the signal voltage components developed during reproduction of the portion 18a' of the seismic wave trace 18a are built up in amplitude to the same extent relative to the other components of the signal voltage train as prevailed in the initially detected seismic wave train. Hence, if the gain control facilities of the test amplifier 54 are operating properly, the amplitude compression realized in this amplifier causes the corresponding portion of the visual trace 53b to be flattened out or compressed to the same extent that compression is retained in the trace 53a. Further, any deviation in the wave pattern of the trace 53b from the trace 53a may be easily determined by direct comparison of the two traces, thus facilitating the detection of distortion in the amplifier 54 other than amplitude distortion. Moreover, by simply changing the speed of reproduction of the traces carried by the record strip 18 it is possible to test the amplifier 54 over a wide range of frequencies equaling or exceeding any range which might actually be encountered in field operations. Thus by suitable manipulation of the adjusting element 47a to change the setting of the speed change mechanism 47, the speed of rotation of the drum 41 may be changed in either direction and in step-by-step fashion as between successive reproducing cycles. Obviously, as the speed of rotation of the drum 41 is increased, the apparent frequency of each wave component of the seismic wave trace 18a is correspondingly increased. The converse action occurs when the speed of rotation of the drum 41 is decreased. Since the gain control trace 18b is reproduced synchronously with the seismic wave trace 18a, rotation of the drum 41 at different speeds to test the amplifier 54 over different frequency ranges does not have the effect of destroying the desired gain control action. Specifically, this action occurs in the exact manner explained above regardless of the speed of reproduction of the two traces.

Although the invention has been described with reference to the testing of seismic wave amplifiers and particularly the testing of the gain control means provided in such amplifiers, it will be understood that the test apparatus is equally adaptable for use in the testing of other units of seismic wave translating equipment which must be characterized by definite and predetermined operating characteristics in order to perform satisfactorily in the field. Thus, the apparatus may be used with equal success in the testing of mixing networks of the character employed to mix two or more seismic waves for the purpose of obtaining a resultant wave therefrom. Again, the apparatus may be used for the purpose of concurrently testing two or more seismic signal amplifying channels. Specifically, the latter form of test operation may be carried out by connecting the input terminals of two or more test amplifiers in parallel across the output terminals of the amplifier 59 and separately connecting the output terminals of the test amplifiers to the driving coils of different galvanometer elements embodied in the oscillographic recorder 52. In such case the visual traces produced by the different galvanometer elements during each recording operation may be independently compared with the standard trace 53a and with each other.

From the above explanation, it will be apparent that the present invention affords a complete and simple solution to the problem of testing seismic wave translating apparatus. Thus, by firing a single explosive charge in the field, a test record 18 is obtained which may be repetitively reproduced to generate a signal accurately representative of the original seismic wave and of the character required for precision testing of different units of seismic wave translating equipment and in particular seismic wave amplifiers equipped with automatic gain control facilities. Thus, the described test apparatus obviates the use of complicated signal generators for synthetically building up signal voltages approximately representative of a seismic wave train. Further, the record obtained lends itself to repetitive reproduction to produce identical signals during successive reproducing operations. These features of the novel test apparatus herein disclosed result in a substantial saving in the cost of testing units of seismic wave translating equipment and also permit determination of the characteristics of such units of equipment with a much higher degree of accuracy.

While one embodiment of the invention has been described, it will be understood that various modifications may be made therein which are within the true spirit and scope of the invention as defined in the appended claims.

I claim:

1. The method of testing a seismic wave amplifier equipped with gain control facilities, which comprises generating a seismic wave train in the earth, detecting said wave train, distorting the relative amplitudes of the different components of said wave train, generating a signal representative of the degree of distortion of said different components of said wave train, synchronously recording said distorted wave train and said signal, synchronously reproducing said recorded wave train and said signal, varying the relative amplitudes of the components of said reproduced wave train in accordance with said reproduced signal, thereby substantially to eliminate the distortion of the relative amplitudes of the components of said wave train, impressing said reproduced wave train with the amplitude distortion eliminated therefrom upon said amplifier, and indicating the response of said amplifier to said wave train impressed thereon.

2. The method of testing a seismic wave amplifier equipped with gain control facilities, which comprises generating a seismic wave train in the earth, detecting said wave train, distorting the relative amplitudes of the different components of said wave train, generating a signal representative of the degree of distortion of said different components of said wave train, synchronously recording said distorted wave train and said signal, synchronously reproducing said recorded wave train and said signal, varying the relative amplitudes of the components of said reproduced wave train in accordance with said reproduced signal, thereby substantially to eliminate the distortion of the relative amplitudes of the components of said wave train, impressing said reproduced wave train with the amplitude distortion eliminated therefrom upon said amplifier, and visually reproducing the output from said amplifier for analysis.

3. The method of determining the gain control and distortion characteristics of a seismic wave amplifier equipped with gain control facilities, which comprises generating a seismic wave train in the earth, distorting the relative amplitudes of the different components of said wave train, generating a signal representative of the degree of distortion of said different components of said wave train, synchronously recording said distorted wave train and said signal, synchronously reproducing said recorded wave train and said signal, varying the relative amplitudes of the components of said reproduced wave train in accordance with said reproduced signal, thereby substantially to eliminate the distortion of the relative amplitudes of the components of said wave train, impressing said reproduced wave train with the amplitude distortion eliminated therefrom upon said amplifier, and synchronously reproducing for visual comparison the output from said amplifier and said reproduced wave train.

4. The method of determining one or more characteristics of a seismic signal amplifier equipped with gain control facilities and having input and output circuits and designed to amplify seismic wave trains having wave components which vary over a wide amplitude range, which comprises generating an electrical signal having a wave form pattern representative of a seismic wave train but with the relative amplitudes of said components distorted, varying the amplitude of said signal so that the amplitude pattern thereof is typically representative of the amplitude pattern of a seismic wave train, impressing said signal on said amplifier input circuit, and synchronously reproducing said signal form and the amplifier output signal for comparison.

5. The method of determining one or more characteristics of a seismic signal amplifier having input and output circuits and designed to amplify seismic wave trains having wave components which vary over a wide amplitude range, which comprises repeatedly generating an electrical signal having a wave form pattern representative of a seismic wave train, varying the amplitude of said signal so that the amplitude pattern thereof is typically representative of the amplitude pattern of a seismic wave train, impressing said signal on said amplifier input circuit, synchronously reproducing in visual form said signal and the output signal of said amplifier for visual comparison, and synchronously varying the speed of generation of said signal to change the frequencies of the different components thereof and the rate of varying the amplitude of said signal, thereby to provide for determination of said one or more characteristics of said amplifier over a range of seismic wave train periods.

6. Apparatus for determining one or more operating characteristics of a seismic signal amplifier equipped with gain control facilities and having input and output circuits and designed to amplify seismic wave trains, comprising means for generating an electrical signal having a wave form pattern typically representative of the wave form pattern of a seismic wave train but with the relative amplitudes of said components distorted, means operated synchronously with said last-named means for varying the amplitude of said signal so that the amplitude pattern thereof is typically representative of the amplitude pattern of a seismic wave train, means for impressing said signal of varying amplitude upon said amplifier input circuit, and means for synchronously reproducing in visual form said generated signal and the amplifier output signal, thereby to provide for visual comparison of the two signals.

7. Apparatus for determining one or more operating characteristics of a seismic signal amplifier having input and output circuits and designed to amplify seismic wave trains, comprising means for repeatedly generating an electrical signal having a wave form pattern typically representative of the wave form pattern of a seismic wave train, means operated synchronously with said last-named means for varying the amplitude of said signal so that the amplitude pattern thereof is typically representative of the amplitude pattern of a seismic wave train, means for impressing said signal of varying amplitude upon said amplifier input circuit, means for synchronously reproducing in visual form said generated signal and the amplifier output signal, thereby to provide for visual comparison of the two signals, and means for changing the speed of generation of said electrical signal to change the frequencies of the different components thereof, thereby to provide for determination of said one or more characteristics of said amplifier over a range of seismic wave train periods.

8. Apparatus for determining one or more operating characteristics of a seismic signal amplifier equipped with gain control facilities and having input and output circuits and designed to amplify seismic wave trains, comprising means for generating an electrical signal having a wave form pattern typically representative of the wave form pattern of a seismic wave train but with the relative amplitudes of said components distorted, means operated synchronously with said last-named means for varying the amplitude of said signal so that the amplitude pattern thereof is typically representative of the amplitude pattern of a seismic wave train, means for impressing said signal of varying amplitude upon said amplifier input circuit, and recording means including recording elements separately excited in accordance with said generated signal and the output signals of said amplifier for recording the two signals on the same record strip, thereby to provide for visual comparison of the recorded signals.

9. Apparatus for determining one or more operating characteristics of a seismic signal amplifier having input and output circuits and designed to amplify seismic wave trains, comprising means for repeatedly generating an electric signal having a wave form pattern typically representative of the wave form pattern of a seismic wave train, means operated synchronously with said last-named means for varying the amplitude of said signal so that the amplitude pattern thereof is typically representative of the amplitude pattern of a seismic wave train, means for impressing said signal of varying amplitude upon said amplifier input circuit, recording means including recording elements separately excited in accordance with said generated signal and the output signal of said amplifier for recording said two signals on the same record strip, thereby to provide for visual comparison of said amplifier two signals, and means for varying the speed of generation of said signal to change the frequencies of the components thereof and for correspondingly changing the rate of varying the amplitude of said signal, thereby to provide for determination of said one or more characteristics of said amplifier over a range of seismic wave train periods.

10. Apparatus for determining one or more operating characteristics of a seismic signal amplifier having input and output circuits and designed to amplify seismic wave trains, comprising photo-electric means for electrically reproducing a recorded wave train characterized by a wave form typically representative of a seismic wave train in all respects excepting the relative amplitudes of the wave components, thereby to produce a first signal representative of a seismic wave train, photo-electric means for synchronously reproducing a gain control record representative of the desired relative amplitudes of the components of said recorded wave train, thereby to produce a gain control signal, means for amplifying said first signal, means responsive to said gain control signal for controlling the gain of said amplifying means to produce the desired relative amplitudes between the amplified components of said first signal, means for impressing said amplified first signal upon the input circuit of said amplifier, and means excited in accordance with said first signal and said amplifier output signal for visually reproducing said two signals in synchronism, thereby to provide for visual comparison of the recorded signals.

11. Apparatus for determining one or more operating characteristics of a seismic signal amplifier having input and output circuits and designed to amplify seismic wave trains, comprising photo-electric means for electrically reproducing a recorded wave train characterized by a wave form typically representative of a seismic wave train in all respects excepting the relative amplitudes of the wave components, thereby to produce a first signal representative of a seismic wave train, photo-electric means for synchronously reproducing a gain control record representative of the desired relative amplitudes of the components of said recorded wave train, thereby to produce a gain control signal, means for amplifying said first signal, means responsive to said gain control signal for controlling the gain of said amplifying means to produce the desired relative amplitudes between the amplified components of said first signal, means for impressing said amplified first signal upon the input circuit of said amplifier, and recording means including recording elements separately excited in accordance with said first signal and the output signal of said amplifier for recording said first and amplifier output signals on the same record strip, thereby to provide for visual comparison of the recorded signals.

12. The method of controlling the gain of a seismic wave amplifier equipped with gain control facilities, which comprises generating a seismic wave train in the earth, producing from said wave train a pair of records respectively representative of the wave form of said seismic wave train but with the relative amplitudes of components of said wave train distorted and of the degree of amplitude distortion of said components, reproducing said records as electrical signals, and impressing on said amplifier the one of said signals corresponding to said wave form record while varying the gain of said amplifier in accordance with variations in the other of said signals.

JAMES E. HAWKINS.

REFERENCES CITED

The following references are of record in the file of this patent:

UNITED STATES PATENTS

| Number | Name | Date |
| --- | --- | --- |
| 2,046,843 | Prescott et al. | July 7, 1936 |
| 2,144,812 | Rieber | Jan. 24, 1939 |
| 2,352,869 | Tolk | July 4, 1944 |
| 2,424,705 | Parr | July 29, 1947 |